United States Patent
Yamada

(10) Patent No.: US 10,240,047 B2
(45) Date of Patent: Mar. 26, 2019

(54) CYANOACRYLATE COMPOSITION AND COATING METHOD USING THE CYANOACRYLATE COMPOSITION

(71) Applicant: THREEBOND CO., LTD., Hachioji-shi, Tokyo (JP)

(72) Inventor: Koji Yamada, Hachioji (JP)

(73) Assignee: THREEBOND CO., LTD., Hachioji-Shi, Tokyo (JP)

(*) Notice: Subject to any disclaimer, the term of this patent is extended or adjusted under 35 U.S.C. 154(b) by 122 days.

(21) Appl. No.: 15/449,442

(22) Filed: Mar. 3, 2017

(65) Prior Publication Data

US 2017/0260398 A1    Sep. 14, 2017

(30) Foreign Application Priority Data

Mar. 8, 2016 (JP) ................................. 2016-043974

(51) Int. Cl.
*C09D 4/00* (2006.01)
*C09D 133/22* (2006.01)
*C04B 41/48* (2006.01)

(52) U.S. Cl.
CPC ............ *C09D 4/00* (2013.01); *C04B 41/4842* (2013.01); *C09D 133/22* (2013.01)

(58) Field of Classification Search
CPC ...... C09D 4/11; C09D 133/22; C04B 41/4842
USPC ......................................................... 524/758
See application file for complete search history.

(56) References Cited

FOREIGN PATENT DOCUMENTS

| JP | H02-69371 A | | 3/1990 |
| JP | 07053924 A | * | 2/1995 |
| JP | 2009-28668 A | | 2/2009 |

* cited by examiner

*Primary Examiner* — Kelechi C Egwim
(74) *Attorney, Agent, or Firm* — Manabu Kanesaka

(57) ABSTRACT

The present invention provides a curable composition having an excellent permeability to a porous substrate and a sufficient strength for use as a coating film, and also having a suitable curing time (set time), accordingly the curable composition having a pot life from the application until the completion of the permeation to pore portions. Particularly, the present invention also provides a favorable coating agent for surface reinforcement coating of a porous substrate. These objects can be achieved by using a curable composition containing the following (A) and (B): (A) a cyanoacrylate compound; and (B) a hydrofluoroether having such a structure that the number of carbon atoms substituted only with fluorine in the molecule is 1 or more to 6 or less, and the number of carbon atoms in the molecule is less than 7.

20 Claims, No Drawings

CYANOACRYLATE COMPOSITION AND COATING METHOD USING THE CYANOACRYLATE COMPOSITION

TECHNICAL FIELD

The present invention relates to a cyanoacrylate composition curable as a thin film on a variety of substrates including a porous substrate, and a coating agent made of the cyanoacrylate composition. Particularly, the present invention relates to: a cyanoacrylate composition for forming a coating film, which is capable of reinforcing the surface of a porous substrate such as gypsum by a simple process of applying and curing the cyanoacrylate composition to and on the substrate surface; and a coating agent made of the cyanoacrylate composition.

BACKGROUND ART

Heretofore, porous substrates such as, for example, gypsum, cements, ceramics, bricks, porcelains, and natural stones have been used for various industrial applications. Especially, gypsum has been utilized in a wide range of fields for applications to engineering product model, dental models, dental embedded materials, arts, medical casts, tunnel reinforcements, construction boards, and so forth. Furthermore, recently, gypsum has been utilized in a laminated material of a 3D printer and hence attracted attention as an engineering material.

On the other hand, gypsum has such a disadvantage that the surface is relatively brittle. To compensate for this disadvantage, it is necessary to apply various coating agents to reinforce the gypsum surface. Particularly, an engineering product model, a dental model, and the like created using a 3D printer are demanded to have no missing part and scratch on the surfaces, and have high dimensional precisions in the modeling. In other words, the coating agents are demanded to be applied thinly for higher precisions of the models and to have sufficient hardness and strength at the same time.

As one of such coating agents, proposed is a composition containing a cyanoacrylate compound as a curable component diluted with a solvent having appropriate properties (hereinafter also referred to as cyanoacrylate composition) (Patent Literature 1). The cyanoacrylate compound imparts sufficient hardness and strength to the cured product when used for the aforementioned surface reinforcement. Moreover, since the cyanoacrylate compound reacts with moisture in air and is curable at normal temperature alone, it is easy to handle and the utilization thereof is promising.

However, in a state where an applied surface such as a coating is exposed to the atmosphere, the cyanoacrylate compound volatilizes and dissipates in air and undergoes a polymerization reaction with a small amount of water in air. The resulting fine solid particles adhere again to the coated product, causing a problem of a whitening phenomenon. As another adverse influence in this state, there is a problem of slow curing because the surface in contact with the atmosphere is cured little by little just with water in air on the surface. Further, in a case where gypsum is used as a porous substrate, when the cyanoacrylate compound is brought into contact with gypsum, the reaction therebetween is promoted because gypsum is a basic substance. Hence, in order to suppress the reaction, a suppressor such as a polymerization inhibitor needs to be added. However, as a trade off, the curability deteriorates, making it difficult to form a uniform coating film. Efforts have been made to solve these problems by using a cyanoacrylate composition made to be curable with an active energy ray such that the cyanoacrylate composition is cured quickly as appropriate by irradiating the applied surface with an active energy ray (Patent Literature 2).

However, when both of the above-described techniques are used in coating the porous substrate surface, the viscosity needs to be reduced to enhance the permeability. To accomplish this, the dilution with a certain amount of a solvent is required. As a result, the concentration of the cyanoacrylate compound in the system becomes too low, making it impossible to form a firm coating film. Further, the latter technique increases the size of the apparatus and the number of steps for the irradiation with an active energy ray. Hence, the achievement by a simpler method is desired.

CITATION LIST

Patent Literature

[Patent Literature 1] Japanese Patent Application Publication No. Hei 2-69371
[Patent Literature 2] Japanese Patent Application Publication No. 2009-28668

SUMMARY OF INVENTION

As described above, in such an application as coating the surface of a porous substrate such as gypsum, when a cyanoacrylate composition is used, it has been difficult to achieve both an appropriate permeability to an uneven surface and a strong coating film.

As a result of intensive studies, it has been found out that the above-described problems are solved by using a cyanoacrylate composition containing a mixture of a cyanoacrylate compound with an organic compound having a particular chemical structure. This finding has led to the present invention. Specifically, a first aspect of the present invention is a curable composition comprising the following (A) and (B):

(A) a cyanoacrylate compound; and
(B) a hydrofluoroether having such a structure that
   the number of carbon atoms substituted only with fluorine in the molecule is 1 or more to 6 or less, and
   the number of carbon atoms in the molecule is less than 7.

Furthermore, the present invention includes the following aspects.

A second aspect of the present invention is the curable composition according to the first aspect, comprising 0.1 to 50 parts by mass of (3) relative to 100 parts by mass of (A).

A third aspect of the present invention is the curable composition according to the first or second aspect, wherein (A) includes alkoxyalkyl-α-cyanoacrylates.

A fourth aspect of the present invention is the curable composition according to any one of the first to third aspects, wherein (A) includes ethoxyethyl-α-cyanoacrylate.

A fifth aspect of the present invention is the curable composition according to any one of the first to fourth aspects, wherein (B) includes a compound having the following structure:

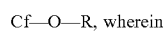

Cf is a primary fluorocarbon group having 6 or less carbon atoms and substituted only with fluorine, R is a primary to tertiary hydrocarbon group having 3 or less carbon atoms and optionally substituted with a heteroatom, and a total number of carbon atoms in Cf and R is less than 7.

A sixth aspect of the present invention is the curable composition according to any one of the first to fifth aspects, further comprising 0.001 to 1.0 parts by mass of an anionic polymerization inhibitor (C) relative to 100 parts by mass of (A).

A seventh aspect of the present invention is the curable composition according to the sixth aspect, wherein (C) is a Lewis acid compound.

An eighth aspect of the present invention is the curable composition according to the seventh aspect, wherein (C) is a boron fluoride derivative.

A ninth aspect of the present invention is the curable composition according to any one of the first to eighth aspects, further comprising 0.001 to 1 parts by mass of a radical polymerization inhibitor (D) relative to 100 parts by mass of (A).

A tenth aspect of the present invention is a coating agent which is the curable composition according to any one of the first to ninth aspects and used in coating the surface of a porous substrate.

An eleventh aspect of the present invention is the coating agent according to the tenth aspect, wherein the porous substrate is gypsum.

A twelfth aspect of the present invention is the coating agent according to the tenth aspect, wherein the porous substrate is an object created using a 3D printer.

The curable composition of the present invention has an excellent permeability to a porous substrate and a sufficient strength as a coating film for reinforcement, and also has a suitable curing time. Accordingly, the curable composition of the present invention has a pot life (set time) from the application until the completion of the permeation to pore portions, and particularly favorable for use as a coating agent for surface reinforcement of a porous substrate.

DESCRIPTION OF EMBODIMENTS

Hereinafter, constitutions of the present invention will be described in detail. A cyanoacrylate compound (A) used in the present invention is known as a main curable component of instant adhesives. In the present invention, conventionally known substances can be used as this compound. Specifically, the cyanoacrylate compound (A) includes alkyl- and cycloalkyl-α-cyanoacrylates such as methyl-α-cyanoacrylate, ethyl-α-cyanoacrylate, propyl-α-cyanoacrylate, butyl-α-cyanoacrylate, and cyclohexyl-α-cyanoacrylate; alkenyl- and cycloalkenyl-α-cyanoacrylates such as allyl-α-cyanoacrylate, methacryl-α-cyanoacrylate, and cyclohexenyl-α-cyanoacrylate; alkynyl-α-cyanoacrylates such as propangyl-α-cyanoacrylate; aryl-α-cyanoacrylates such as phenyl-α-cyanoacrylate and tolyl-α-cyanoacrylate; alkoxyalkyl-α-cyanoacrylates such as methoxymethyl-α-cyanoacrylate, ethoxymethyl-α-cyanoacrylate, propoxymethyl-α-cyanoacrylate, methoxyethyl-α-cyanoacrylate, and ethoxyethyl-α-cyanoacrylate; furfuryl-α-cyanoacrylate; trimethylsilylmethyl-α-cyanoacrylate containing silicon; trimethylsilylethyl-α-cyanoacrylate; trimethylsilylpropyl-α-cyanoacrylate; dimethylvinylsilylmethyl-α-cyanoacrylate, and the like. A mixture of two or more selected from these may be used. Among these, in the present invention, alkoxyalkyl-α-cyanoacrylates are preferable, and ethoxyethyl-α-cyanoacrylate further preferable, from the viewpoints of relatively low volatilities, the properties of the cured products, the cost, and so forth.

A hydrofluoroether (B) used in the present invention has such a structure that the number of carbon atoms substituted only with fluorine is 1 or more to 6 or less, preferably 2 to 5, and the number of carbon atoms in the molecule is less than 7. The hydrofluoroether (B) is a component for imparting a suitable permeability to the curable composition with no deterioration in the working environment. Herein, carbon substituted only with fluorine refers to: carbon to which three fluorine atoms are bonded, the carbon being a carbon atom in an alkyl group and located at the terminal of the molecular chain; or carbon to which two fluorine atoms are bonded, the carbon atom being located at neither the terminal of the molecular chain nor branched positions; but does not refer to carbon at branched positions. Further, in the present invention, a compound having a structure of Cf—O—R is more favorable. Here, Cf is a primary fluorocarbon group having 6 or less, preferably 5 or less, carbon atoms and substituted only with fluorine. R is a primary to tertiary hydrocarbon group having 3 or less carbon atoms and optionally substituted with a heteroatom. A total number of carbon atoms in Cf and R is less than 7.

In the present invention, known commercial products can be used as long as the compounds have the above-described structure. These commercial products specifically include products of 3M Japan Limited such as Novec 7100 (chemical formula: $C_4F_9OCH_3$) and Novec 7200 (chemical formula: $C_4F_9OC_2H_5$), products of Daikin Industries, Ltd. such as 2,2,2-trifluoroethyl difluoromethyl ether (chemical formula: $CF_3CH_2OCHF_2$), 2,2,3,3,3-pentafluoropropyl difluoromethyl ether (chemical formula: $CF_3CF_2CH_2OCHF_2$), T-1216 (chemical formula: $CF_3CF_2CH_2OCF_2CF_2H$), T-7301 (chemical formula: $(CF_3)_2CHOCH_3$), 1,1,3,3,3-pentafluoro-2-trifluoromethylpropyl methyl ether (chemical formula: $(CF_3)_2CHCF_2OCH_3$), 1,1,2,3,3,3-hexafluoropropyl methyl ether (chemical formula: $CF_3CHFCF_2OCH_3$), 1,1,2,3,3,3-hexafluoropropyl ethyl ether (chemical formula: $CF_3CHFCF_2OCH_2CH_3$), 2,2,3,4,4,4-hexafluorobutyl difluoromethyl ether (chemical formula: $CF_3CHFCF_2CH_2OCHF_2$); and the like. A mixture of two or more selected from these may be used. Among these, Novec 7100, and Novec 7200 are particularly preferable from the viewpoints of permeability and volatility.

In the curable composition of the present invention, the composition amount of the component (B) is within a range of preferably 0.1 to 50 parts by mass, more preferably 0.2 to 25 parts by mass, and furthermore preferably 0.5 to 15 parts by mass, relative to 100 parts by mass of (A). The component (B) in an amount of 0.1 parts by mass or more enables the curable composition of the present invention to acquire a desirable permeability. The component (B) in an amount of 50 parts by mass or less enables the coating film after curing to have a required strength. In a conventionally known composition containing a diluted cyanoacrylate compound to form a coating film, the content of a volatile solvent contained in the composition is the same as or larger than the amount of the cyanoacrylate compound in terms of mass. In contrast, in the present invention, even though the amount of the component (B) is far smaller than these, an appropriate permeability is exhibited. This product is the most characteristic component of the present invention.

The curable composition of the present invention may further contain an anionic polymerization inhibitor (C). The anionic polymerization inhibitor is a substance having an action of suppressing an anionic polymerization reaction of the cyanoacrylate compound. The anionic polymerization inhibitor (C) suppresses the reaction on the porous substrate surface and thereby acts on the permeation to porous, uneven deep portions. Among porous substrates, particularly gypsum has a surface under a basic condition, so that the cyanoacrylate compound is likely to undergo an anionic polymerization. Hence, if the permeation action to deep portions is insufficient, the reaction activity has to be suppressed to some extent. Thus, the component is preferably used.

When the anionic polymerization inhibitor (C) is used in the curable composition of the present invention, the composition amount is within a range of 0.001 to 1.0 parts by mass, more preferably 0.003 to 0.75 parts by mass, and furthermore preferably 0.005 to 0.5 parts by mass, relative to 100 parts by mass of (A). The anionic polymerization inhibitor (C) in an amount of 0.001 parts by mass or more exhibits a desired reaction-suppressing action. The anionic polymerization inhibitor (C) in an amount of 1.0 parts by mass or less does not impair the required reaction activity.

Here, as a substance usable as the anionic polymerization inhibitor, a Lewis acid compound is known. Examples of the Lewis acid compound include sulfur dioxide, sulfur trioxide, methanesulfonic acid, hydrogen fluoride, p-toluenesulfonic acid, zinc oxide, magnesium oxide, aluminum chloride, tin chloride, trimethoxyborane, triphenylborane, boron fluoride derivatives, and the like. In the present invention, particularly preferable Lewis acid compounds are boron fluoride derivatives, and specifically include ether-complex containing boron trifluoride, zinc fluoroborate, potassium fluoroborate, tin fluoroborate, and the like. Among these, ether-complex containing boron trifluoride is particularly preferable. A mixture of several types of these substances may be used, as long as the actions of the present invention are not impaired.

The curable composition of the present invention may further contain a radical polymerization inhibitor (D). The radical polymerization inhibitor is added so as to capture a radical species generated by an active energy ray such as light or a stimulus such as heat during the storage of the curable composition. When the radical polymerization inhibitor (D) is used in the curable composition of the present invention, the composition amount is within a range of 0.001 to 5 parts by mass, more preferably 0.005 to 3 parts by mass, and furthermore preferably 0.01 to 1 parts by mass, relative to 100 parts by mass of (A). The radical polymerization inhibitor (D) in an amount within a range of the above parts by mass enables the curable composition of the present invention to achieve both suitable curability and storage stability.

As the radical polymerization inhibitor, known substances can be used such as hydroquinone, p-methoxyphenol, butylhydroxytoluene, 4-tert-butylcatechol, and phenothiazine. Particularly, a phenolic compound can be favorably used. A preferable radical polymerization inhibitor is ADEKA STAB AO-60; pentaerythritol tetrakis [3-(3,5-di-tert-butyl-4-hydroxyphenyl)propionate], a product of Adeka Corporation. A mixture of several types of these substances may be used, as long as the actions of the present invention are not impaired.

To the curable composition of the present invention, it is possible to further add if necessary various additives as appropriate such as a viscosity modifier, a thixotropic agent, an adhesion promoter, a storage stability enhancer, a polymerization promoter, a strength-toughness improver, a photo activator such as a metallocene compound, a filler, a plasticizer, a heat stabilizer, a fragrance, a dye, and a pigment, as long as the actions of the present invention are not impaired. In the present invention, it is desirable to add an adhesion promoter from the viewpoint of enhancing the adhesion to a substrate. Known substances can be used as the adhesion promoter, and an acrylonitrile-butadiene copolymer, pyrogallol, or a mixture thereof can be favorably used.

A preferable use of the present invention is a coating agent used in coating the porous substrate surface. The coating agent is used more preferably when the porous substrate is gypsum, and furthermore preferably when the porous substrate or the gypsum is an object created using a 3D printer.

When the curable composition of the present invention is applied to a porous substrate, the permeability to an uneven surface of the porous substrate is excellent. In addition, the curability hardly deteriorates even when a thin film is formed, and the thickness is still capable of imparting a required strength for reinforcement. Further, the curable composition of the present invention eliminates the need for irradiation with an active energy ray or a stimulus such as heating, and hence does not need these complicated steps.

The curable composition of the present invention is widely applicable to gypsum, cements, ceramics, and the like, which serve as the porous substrate. In the present invention, the application to gypsum is particularly preferable. Moreover, the application is not limited to gypsum, and the curable composition of the present invention is further preferably applied to the surface of an object created using a 3D printer so as to reinforce the object. The creation using a 3D printer is further preferably employed for an object created according to output processes such as powder bed deposition and selective laser sintering resulting in a porous surface. In other words, for the above-described reasons, when applied to the created object having quite an uneven surface, the curable composition of the present invention is capable of permeating inside the asperity and reinforcing the surface by forming a uniform and smooth coating film. Thus, the curable composition of the present invention is optimal for the application to coating agents for reinforcement. Note that although preferable means can be selected as appropriate for the method for applying the curable composition of the present invention to these substrates, impregnation application is particularly favorable from the viewpoints of ease of operation and so forth.

Coating Method

The present invention also relates to a coating method using the above-described curable composition. Specifically, for example, the present invention provides a coating method including the steps of:

applying, to a porous substrate surface, a curable composition containing (A) a cyanoacrylate compound, and (B) a hydrofluoroether having such a structure that
  the number of carbon atoms substituted only with fluorine in the molecule is 1 or more to 6 or less, and
  the number of carbon atoms in the molecule is less than 7; and curing the applied curable composition.

Examples of the porous substrate include gypsum, cements, ceramics, bricks, porcelains, natural stones, object created using a 3D printer, and the like. The details of the components (A) and (B) are as described above.

Hereinafter, the present invention will be described in more details byway of Examples. However, the present invention is not limited to these Examples.

EXAMPLES

The following materials were used as the raw materials of each curable composition (hereinafter also referred to simply as composition) used in Examples and Comparative Examples. Based on the composition amounts shown in Tables 1 and 2, the materials were blended by mixing and stirring at normal temperature in a nitrogen-purged environment. Here, the composition amount of each composition shown in the tables is represented by parts by mass.

(A) Component (A1) Z84: ethoxyethyl-α-cyanoacrylate; a product of Alteco Co., Ltd.

(B) Components (B1) Novec 7100: a compound liquid at normal temperature and having a boiling point of 61° C.; chemical formula=$C_4F_9OCH_3$; a hydrofluoroether in which the number of carbon atoms substituted only with fluorine was 4, and the number of carbon atoms in the molecule was 5; a product of 3M Japan Limited (B2) Novec 7200: a compound liquid at normal temperature and having a boiling point of 76° C.; chemical formula=$C_4F_9OC_2H_5$; a hydrofluoroether in which the number of carbon atoms substituted only with fluorine was 4, and the number of carbon atoms in the molecule was 6; a product of 3M Japan Limited (B) Components in Comparative Examples (B'1) Novec 7300: a compound liquid at normal temperature and having a boiling point of 98° C.; chemical formula=$C_2F_5CF(OCH_3)C_3F_7$; a hydrofluoroether in which the number of carbon atoms substituted only with fluorine was 5, and the number of carbon atoms in the molecule was 7; a product of 3M Japan Limited (B'2) 1-bromopropane: a reagent; a product of Wako Pure Chemical Industries, Ltd.

(B'3) acetone: a product of Godo Co., Ltd.

(B'4) methylene chloride: a product of Tokuyama Corporation (B'5) toluene: a product of Godo Co., Ltd.

(B'6) methyl ethyl ketone (MEK): a product of Godo Co., Ltd.

(B'7) bis(2-ethylhexyl)phthalate (DOP): a product of Tokyo Chemical Industry Co., Ltd.

(B'8) acetyl tributyl citrate (ATBC): a product of Asahi Kasei Finechem Co., Ltd.

(B'9) KF-96L-0.65CS: dimethyl silicone oil having methyl groups at all the side chains and ends of the polysiloxane; kinetic viscosity of 0.65 mm²/s at 25° C.; a product of Shin-Etsu Chemical Co., Ltd.

(B'10) KF-96L-2CS: dimethyl silicone oil having methyl groups at all the side chains and ends of the polysiloxane; kinetic viscosity of 2.0 mm²/s at 25° C.; a product of Shin-Etsu Chemical Co., Ltd.

(C) Component (C1) $BF_3$ ethyl ether complex salt ($BF_3$): a product of Morita Chemical Industries Co., Ltd.; a monoethyl ether complex of boron trifluoride (D) Component (D1) ADEKA STAB AO-60: pentaerythritol tetrakis [3-(3,5-di-tert-butyl-4-hydroxyphenyl)propionate]; a product of Adeka Corporation (Other Component)

pyrogallol: adhesion promoter; a product of Yoneyama Yakuhin Kogyo Co., Ltd.

Each composition was evaluated by the following test methods, and the properties were evaluated. Note that the evaluation results were shown in Tables 1 and 2.

1. Evaluation of Basic Properties

[Appearance Evaluation]

Each composition produced by mixing and stirring was filled into a colorless, transparent glass bottle, and the appearance was visually observed. Two properties were checked: hue and solubility. The hue was determined by comparison with color samples by selecting one believed to be the most closest. The solubility was determined by checking the degree of the turbidity of a liquid and the presence or absence of a precipitate or separation; if none was found, the solubility was rated as "transparent"; if a turbidity was found, "suspended"; if a precipitate or separation was found, "insoluble". Note that when an insoluble or suspended composition was found, it was determined to be not suitable for the evaluation, and no further evaluation was conducted.

[Viscosity]

In an environment of 25° C., each composition was put in a plastic cup. Using a BL-type viscometer (a product of Toki Sangyo Co., Ltd.), a rotor was rotated at a rotation speed of 60 rotations/minute. A measurement value was obtained by reading a numerical value (mPa·s) displayed 30 seconds later.

[Set Time]

Two nitrile rubber O-rings (Buna-N—O ring Cord 70 Duro ¼ inch) were prepared as one set, and used as test pieces. In an environment of 25° C., each composition was thinly applied to the entire surface of one side of one of the test pieces, and other test piece was laid on the applied surface, fixed and bonded together by holding the test pieces by the finger for 10 seconds. After the bonding, the O-rings were pulled by applying a load of 98 N (10 kgf) in a direction in which the O-rings stretched. A time when the O-rings were broken was determined as a set time (s). When a composition permeates to pore portions of a porous substrate, it is preferable to have a certain set time, and a favorable value is approximately 60 to 180 s.

[Tensile Shear Adhesive Strength]

SPCC-SD (1.6×25×100 mm, a product of Asahi-Betechno) was washed with toluene. The surface other than the punched surface was sufficiently polished with #240 polishing cloth, and then subjected to ultrasonic vibration in a toluene bath. Two of such plates were prepared as one set, and used as test pieces. In an environment of 25±2° C. and 50±10% RH, two drops of each composition was dropped in an area 10 mm from an end of the polished surface of one of the test pieces by using a pipette. An area 10 mm from an end of the other polished surface was overlapped with the dropped portion, and gently leveled, so that the composition was spread over the entire overlapped portions. Subsequently, the test pieces were fixed and bonded together by holding the test pieces by the finger for 5 seconds. Thereafter, in the same environment, the resultant was left standing for 24 hours and cured. The tensile shear adhesive strength was measured using a universal tensile testing machine (Tensilon RTF, a product of Orientec Corporation) at a tensile speed of 10 mm/min. The measurement conditions followed JIS-K-6861 (testing method for cyanoacrylate adhesives). An adhesive strength is an indicator of adhesion to a substrate. The larger the value, the more desirable.

2. Operability Evaluation

Using a commercially available inkjet powder deposition type 3D printer (ProJet x60; registered trademark, a product of Canon Inc.), gypsum was shaped to 50×50×2 mm, and used as a test piece. For the operability, the following five tests were conducted. As the criteria of good or bad in the present invention, a composition with zero ratings of "poor" and less than two ratings of "fair" was determined to be acceptable.

[Permeability]

In an environment of 25° C., the test piece was immersed in a bath filled with one of the compositions. After 10 seconds, the test piece was pulled up, and the surface was visually observed to evaluate the degree of the permeation of the composition. The evaluation criteria were as follows.

Excellent: thoroughly permeated in the asperity of the surface

Good: permeated in the asperity of the surface, but some liquid remained above, and a non-permeated portion existed Fair: the liquid remained above, and a non-permeated portion existed in approximately 10% or more to approximately less than 30% of the entire surface Poor: the liquid remained above, and a non-permeated portion existed in approximately 30% or more of the entire surface

[Curability]

The test piece immersed in the permeability evaluation was left standing in an environment of 25° C. for 24 hours and cured. The surface was visually observed to evaluate the state of the coating film. Note that the test piece which was not excellent in the permeability evaluation was marked on a smooth area of the surface, and after the curing, the area with the mark was observed. The evaluation criteria were as follows.

Good: the coating film was uniform, and no whitening was observed

Fair: on the surface of the coating film, either a non-uniform portion or whitening was observed in approximately 10% or more to approximately less than 30% of the entire portion of the observed area Poor: on the surface of the coating film, either a non-uniform portion or whitening was observed in approximately 30% or more of the entire portion of the observed area

[Reinforcement Strength]

A certain portion of the test piece surface after the curability evaluation was scratched with a finger tip degreased with alcohol, and observed to find out whether the surface collapsed or not. First, the test piece surface was scratched by a weak force back and forth approximately three times. At this point, if the surface did not collapse, the test piece surface was scratched by a stronger force back and forth approximately three times to evaluate the reinforcement strength.

The evaluation criteria were as follows.

Good: not collapsed even if scratched strongly
Fair: collapse was observed by strong scratching
Poor: collapse was observed even by weak scratching

[Workability]

The workability was evaluated by a sensory test regarding: the ease of stirring the composition in an uncured state when was stirred; and the ease of brushing when the composition was applied using a brush. As to the stirring, each composition was put in a plastic cup in an environment of 25° C., and shaken using a polypropylene stirring rod by hand. The ease of shaking in this event was evaluated as a resistance. As to the brushing, each composition was slowly applied to a smooth gypsum board using a brush, and the smoothness in this event was evaluated as a resistance. The evaluation criteria were as follows.

Excellent: resistances were hardly felt in both the stirring and the brushing, and these were smoothly conducted Good: a resistance was slightly felt in either the stirring or the bushing Fair: a resistance was felt in either the stirring or the bushing

[Odor]

Each composition in an uncured state was put in a container having an opening at the top, and sniffed at a distance 30 cm away therefrom to evaluate the odor by a sensory test. The evaluation criteria were as follows.

Good: hardly smelled
Fair: slightly smelled
Poor: distinctively smelled

|  |  |  | Examples | | | |
| --- | --- | --- | --- | --- | --- | --- |
|  | product name |  | 1 | 2 | 3 | 4 |
| (A) | Z84 |  | 100 | 100 | 100 | 100 |
| (B) | Novec 7100 |  | 4 | 4 |  |  |
|  | Novec 7200 |  |  |  | 4 | 4 |
| (C) | BF$_3$ |  | 0.3 | 0.4 | 0.4 | 1.0 |
| (D) | ADEKA STAB AO-60 |  | 0.1 | 0.1 | 0.1 | 0.1 |
| other | pyrogallol |  | 0.2 | 0.2 | 0.2 | 0.2 |
| basic properties | appearance | hue | pale yellow | pale yellow | pale yellow | pale yellow |
|  |  | solubility | transparent | transparent | transparent | transparent |
|  | viscosity [mPa · s] |  | 5.0 | 4.9 | 5.0 | 4.9 |
|  | set time [s] |  | 80 | 120 | 120 | 180 |
|  | tensile shear adhesive strength [MPa] |  | 15.8 | 16.4 | 16.0 | 17.1 |
| operability | permeability |  | excellent | excellent | excellent | good |
|  | curability |  | good | good | good | good |
|  | reinforcement strength |  | good | good | good | fair |
|  | workability |  | excellent | excellent | excellent | good |
|  | odor |  | good | good | good | good |

|  |  | Comparative Examples | | | | | | | |
| --- | --- | --- | --- | --- | --- | --- | --- | --- | --- |
|  | product name | 1 | 2 | 3 | 4 | 5 | 6 | 7 | 8 |
| (A) | Z84 | 100 | 100 | 100 | 100 | 100 | 100 | 100 | 100 |
| (B') | Novec 7300 |  |  |  |  | 4 |  |  |  |
|  | 1-bromopropane |  |  |  |  |  | 4 |  |  |
|  | KF-96L-0.65cs |  |  |  |  |  |  | 4 |  |
|  | KF-96-1cs |  |  |  |  |  |  |  | 4 |
|  | KF-96-2cs |  |  |  |  |  |  |  |  |
|  | acetone |  |  |  |  |  |  |  |  |
|  | methylene chloride |  |  |  |  |  |  |  |  |
|  | toluene |  |  |  |  |  |  |  |  |
|  | methyl ethyl ketone |  |  |  |  |  |  |  |  |
|  | DOP |  |  |  |  |  |  |  |  |
|  | ATBC |  |  |  |  |  |  |  |  |
| (C) | BF$_3$ |  | 0.3 | 0.5 | 0.7 | 0.4 | 0.4 | 0.4 | 0.4 |

-continued

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| (D) | ADEKA STAB AO-60 | | | | | 0.1 | 0.1 | 0.1 | 0.1 |
| other | pyrogallol | 0.2 | 0.2 | 0.2 | 0.2 | 0.2 | 0.2 | 0.2 | 0.2 |
| basic properties | appearance hue | pale yellow | pale yellow | pale yellow | pale yellow | pale yellow | pale yellow | pale yellow | pale yellow |
| | solubility | transparent | transparent | transparent | transparent | insoluble suspended | transparent | insoluble suspended | insoluble suspended |
| | viscosity [mPa·s] | 5.5 | 5.5 | 5.5 | 5.5 | — | 4.8 | — | — |
| | set time [s] | 2 | 20 | 50 | 80 | — | 70 | — | — |
| | tensile shear adhesive strength [MPa] | 10.1 | 15.0 | 14.0 | 14.2 | — | 15.4 | — | — |
| operability | permeability | poor | fair | fair | fair | — | excellent | — | — |
| | curability | poor | fair | fair | fair | — | good | — | — |
| | reinforcement strength | poor | good | good | fair | — | fair | — | — |
| | workability | excellent | good | good | good | — | fair | — | — |
| | odor | good | good | good | good | — | poor | — | — |

| | | Comparative Examples | | | | | | |
|---|---|---|---|---|---|---|---|---|
| | product name | 9 | 10 | 11 | 12 | 13 | 14 | 15 |
| (A) | Z84 | 100 | 100 | 100 | 100 | 100 | 100 | 100 |
| (B') | Novec 7300 | | | | | | | |
| | 1-bromopropane | | | | | | | |
| | KF-96L-0.65cs | | | | | | | |
| | KF-96-1cs | | | | | | | |
| | KF-96-2cs | 4 | | | | | | |
| | acetone | | 4 | | | | | |
| | methylene chloride | | | 4 | | | | |
| | toluene | | | | 4 | | | |
| | methyl ethyl ketone | | | | | 4 | | |
| | DOP | | | | | | 4 | |
| | ATBC | | | | | | | 4 |
| (C) | BF$_3$ | 0.4 | 0.4 | 0.4 | 0.4 | 0.4 | 0.4 | 0.4 |
| (D) | ADEKA STAB AO-60 | 0.1 | 0.1 | 0.1 | 0.1 | 0.1 | 0.1 | 0.1 |
| other | pyrogallol | 0.2 | 0.2 | 0.2 | 0.2 | 0.2 | 0.2 | 0.2 |
| basic properties | appearance hue | pale yellow | pale yellow | pale yellow | pale yellow | pale yellow | pale yellow | pale yellow |
| | solubility | insoluble suspended | transparent | transparent | transparent | transparent | transparent | transparent |
| | viscosity [mPa·s] | — | 4.2 | 4.7 | 4.6 | 4.8 | 5.6 | 5.5 |
| | set time [s] | — | 40 | 50 | 50 | 60 | 80 | 60 |
| | tensile shear adhesive strength [MPa] | — | 12.5 | 14.5 | 13.1 | 13.4 | 16.5 | 15.4 |
| operability | permeability | — | good | excellent | excellent | excellent | fair | fair |
| | curability | — | poor | good | good | good | poor | poor |
| | reinforcement strength | — | poor | poor | poor | fair | fair | fair |
| | workability | — | good | good | good | good | good | good |
| | odor | — | fair | fair | fair | poor | good | good |

The results of Examples in Table 1 verified that all of the compositions of the present invention were uniformly mixed and dispersed in a liquid state, and had suitable set times when cured and sufficient tensile shear adhesive strengths after the curing. Further, regarding the permeability, which is a particularly important property in the operability, the compositions of Examples 1 to 3 exhibited excellent results. Regarding the other properties, all of Examples 1 to 3 had preferable evaluation results. Note that it was verified as shown by Example 4 that increasing the composition amount of (B) decreased the curability and the workability, although these are not practical problems.

The results of Comparative Examples in Table 2 verified that the compositions not within the scope of the present invention, for example, all of Comparative Examples 1 to 4 containing no (B), were uniformly mixed and dispersed in a liquid state, but had short set times, and that the results of the tensile shear adhesive strength and the permeability, which is particularly important in the operability, were inferior to those of Examples. In this respect, since increasing the set time by increasing the amount of (C) decreases the reinforcement strength as a trade off, the compositions containing no (B) were not practically usable. On the other hand, in Comparative Examples 5 to 15 using compounds not having a structure corresponding to that of (B) specified in the present invention, the systems were not uniformly mixed and dispersed, or even if uniform, had problems with some of the basic properties and the operability. Unless uniformly mixed and dispersed, the composition cannot form a uniform coating film, making the use as a coating agent difficult. The compositions having problems with the basic properties and the operability cannot be practically used.

INDUSTRIAL APPLICABILITY

From the above results, the curable composition of the present invention has appropriate basic properties, and is still capable of forming a uniform coating film by permeating to pore portions of a porous substrate when applied thereto. Particularly, the curable composition of the present invention is useful in surface coating, by a simple process, of porous substrates, particularly an object created from gypsum or the like using a 3D printer.

All the literatures mentioned above are incorporated herein by reference.

The invention claimed is:

1. A curable composition comprising the following (A) and (B):
   (A) a cyanoacrylate compound; and
   (B) a hydrofluoroether having such a structure that the number of carbon atoms substituted only with fluorine in the molecule is 1 or more to 6 or less, and the number of carbon atoms in the molecule is less than 7.

2. The curable composition according to claim 1, comprising 0.1 to 50 parts by mass of (B) relative to 100 parts by mass of (A).

3. The curable composition according to claim 1, wherein (A) includes alkoxyalkyl-α-cyanoacrylates.

4. The curable composition according to claim 1, wherein (A) includes ethoxyethyl-α-cyanoacrylate.

5. The curable composition according to claim 1, wherein (B) includes a compound having the following structure:

Cf—O—R, wherein

Cf is a primary fluorocarbon group having 6 or less carbon atoms and substituted only with fluorine,
R is a primary to tertiary hydrocarbon group having 3 or less carbon atoms and optionally substituted with a heteroatom, and
a total number of carbon atoms in Cf and R is less than 7.

6. The curable composition according to claim 1, further comprising 0.001 to 1.0 parts by mass of an anionic polymerization inhibitor (C) relative to 100 parts by mass of (A).

7. The curable composition according to claim 6, wherein (C) is a Lewis acid compound.

8. The curable composition according to claim 7, wherein (C) is a boron fluoride derivative.

9. The curable composition according to claim 1, further comprising 0.001 to 1 parts by mass of a radical polymerization inhibitor (D) relative to 100 parts by mass of (A).

10. A coating agent comprising the curable composition according to claim 1.

11. A coating agent comprising the curable composition according to claim 6.

12. A coating agent comprising the curable composition according to claim 9.

13. A coating method comprising the steps of:
    applying, to a porous substrate surface, a curable composition containing
      (A) a cyanoacrylate compound, and
      (B) a hydrofluoroether having such a structure that
        the number of carbon atoms substituted only with fluorine in the molecule is 1 or more to 6 or less, and
        the number of carbon atoms in the molecule is less than 7; and
    curing the applied curable composition.

14. The coating method according to claim 13, wherein the porous substrate is gypsum.

15. The coating method according to claim 13, wherein the porous substrate is an object created using a 3D printer.

16. The coating method according to claim 13, wherein (B) is contained in an amount of 0.1 to 50 parts by mass relative to 100 parts by mass of (A).

17. The coating method according to claim 13, wherein (A) includes alkoxyalkyl-α-cyanoacrylates.

18. The coating method according to claim 13, wherein (B) includes a compound having the following structure:

Cf—O—R, wherein

Cf is a primary fluorocarbon group having 6 or less carbon atoms and substituted only with fluorine,
R is a primary to tertiary hydrocarbon group having 3 or less carbon atoms and optionally substituted with a heteroatom, and
a total number of carbon atoms in Cf and R is less than 7.

19. The coating method according to claim 13, wherein an anionic polymerization inhibitor (C) is further contained in an amount of 0.001 to 1.0 parts by mass relative to 100 parts by mass of (A).

20. The coating method according to claim 13, wherein a radical polymerization inhibitor (D) is further contained in an amount of 0.001 to 1 parts by mass relative to 100 parts by mass of (A).

* * * * *